PROCESS FOR SPRAY DRYING PIGMENT

Filed Dec. 26, 1972 2 Sheets-Sheet 1

MAGNIFICATION 106 POWER

MAGNIFICATION 12,000 POWER

United States Patent Office 3,843,380 Patented Oct. 22, 1974

3,843,380

PROCESS FOR SPRAY DRYING PIGMENT

Edgar Joachim Beyn, Annapolis, Md., assignor to SCM Corporation, Cleveland, Ohio Filed Dec. 26, 1972, Ser. No. 318,481
Int. Cl. C09c *1/04, 1/36*
U.S. Cl. 106—300 19 Claims

ABSTRACT OF THE DISCLOSURE

Free-flowing and substantially dustless mineral pigment aggregates are made from primary mineral pigment particles, e.g., pigmentary titanium dioxide, by the improvement of spray drying an aqueous slurry of said pigment particles containing about 0.1 to about 5% of a water-dispersible thickener, based on the weight of the particles. An efficient gathering of fines into the spray droplets occurs with little or no loss of pigment. The resulting aggregates are free-flowing and useful for compounding into paints and plastic mixtures.

The present invention relates to a novel and improved process for treating mineral pigments, and to the product made thereby which is both free-flowing and dustless.

The invention will be described with initial reference to titanium dioxide pigments, especially for paints and plastics because it is the most important of the pigments, although it will be understood that the invention has other applications. The titanium dioxide can be either rutile or anatase. Examples of other white opacifying pigments with which the invention is applicable are lithopone, zinc sulfide, lead titanate, antimony oxide, zirconium oxide, titanium calcium, white lead, titanium barium, zinc oxide, leaded zinc oxide, and mixtures of the same. Other pigments such as iron oxides, chrome yellow, chrome green, lead chromate and cuprous oxides may also be treated in accordance with the concepts of the present invention. The invention also has application to the treatment of pigments for uses other than with paints and plastics.

For purposes of the present application, the term "paint" shall mean any fluent, liquid phase-continuous material or powdery mixture, within the conventional definition of the word useful for film-forming, and shall include water-base latex paints, alkyd resin paints, enamels, inks, lacquers, acrylic and other solvent-base paint. The term "plastic" defines any conventional moldable material within the common usage of the word.

Thermoplastic resins, thermosetting resins and portland cement concrete are illustrative plastic materials. Other applications for the present invention are paper making, rubber making and other typical processes employing mineral pigments.

Also for purposes of the present application, the term "dispersible" implies either miscibility or solubility or both. Thus, a dispersible component is one that is stably soluble in or stably dispersed in, usually at extreme fineness not substantially larger than about a micron in effective diameter, another material or other materials under conditions of the ordinary use of the resulting composition.

BACKGROUND OF THE INVENTION

Primary pigment particles of titanium dioxide may be obtained by either the sulfate process or the chloride process. Conventionally, these primary pigment particles are subjected to a plurality of treatment steps, which may include the usual finish treatment of the oxide particles with up to 12–14% inorganic hydrous oxides such as silica and alumina. The amount of hydrous oxides employed is dependent upon the grade type of pigment desired.

Conventionally, the finish-treated pigment will have on its surface about 2%–14% hydrous oxides for paint grades and about 1 to 1½% for plastic grades. Flat paints require the highest level of inorganic oxide treatment. The surface treatment is followed by filter washing to remove soluble salts, and then drying and final dry milling to reduce agglomerations. The latter step is required because of the strong binding action of the hydrous oxides which tend to form gels on the surface of the pigment particles. These hydrous oxide bonds are not readily destructible when the pigments are added to paints and plastics. As a result, the pigments are not uniformly dispersed in the paints and plastics in the absence of dry milling.

Conventional processing may also include the addition of a plasticizer to the pigment slurry prior to drying to render the pigment more readily dispersible in a paint or plastic.

Multiple handling problems have heretofore been experienced with conventionally treated pigments. Dry milling, although reducing agglomerations, causes the pigments to have a high degree of dustiness. In addition, the pigment particles tend to lump and cake upon compression and storage, particularly if bulk-stored. Further, the discrete pigment particles following dry milling are not free-flowing. As a result, conventional pigments require bagging and cannot normally be bulk handled.

SUMMARY OF THE INVENTION

According to the present invention, the above disadvantages are overcome by the steps including forming a pumpable slurry of the primary pigment particles with water and about 0.1 to about 5%, based on the pigment particle weight, of a water-dispersible thickener. The slurry is atomized and spray dried, and minute, discrete pigment aggregates are recovered by conventional cyclone separation. Preferably the drying is accomplished at an inlet drying temperature of not substantially in excess of about 400° F.

The primary pigment particles may or may not be surface treated with inorganic hydrous oxides.

The thickener which is added to the pigment slurry may be any organic, colloidal, high molecular weight compound which is capable, in small concentrations of visably causing thickening when added to water. Preferably, a 2% solution of the thickener in water should have a viscosity at 20° C. of at least about 100 centipoises. The thickener should be normally a solid at room temperature and preferably essentially non-degradable at drying temperatures, and should be capable of redissolving or redispersing in the admixture to which the pigment is added. For instance, in the case of a latex paint, the thickener should be capable of redissolving or redispersing in water, whereas in the case of solvent-based paints, the thickener should be capable of dissolving or redispersing in the solvent. In the case of plastics, the thickener should be meltable at the processing temperatures for the plastics.

Examples of particularly suitable thickeners for use in the treating of pigments for latex paints and plastics are the conventional cellulosic thickeners for such paints and alkylene oxide polymers, such as ethylene oxide polymers having a molecular weight of about 100,000 and 900,000, sold under the trademark (Union Carbide Company). For pigments for solvent-based paints, suitable thickeners are the polyalkylene glycol esters, e.g., polyethylene glycol (Molecular weight 400) monooleate having an HLB value of 11.4. Preferably the ethylene oxide polymers are employed in amounts of about 0.3 to about 0.8% based on the weight of the pigment, for latex paint pigments and in an amount of about 0.1% for pigment for plastics. The polyalkylene glycol esters are employed in somewhat larger amounts in connection with pigments for solvent based paints.

It was found that the addition of such a thickener to the slurry, in small amounts, prior to spray drying resulted in an efficient collection or gathering of fines into the spray droplets with little or no loss of pigment by cyclone separation following drying. In addition, it is believed the thickener provided a surface tension control of the drop size which resulted in the formation of aggregates of sufficient bulk density to be free-flowing. On mixing of the pigment aggregates in paints and plastics, the aggregate bonds were readily destructible permitting dispersion of the primary pigment particles in the paint or plastics.

Products made in accordance with the present invention offered all of the essential qualities of high opacity, dispersibility, brightness and tinting strength possessed by conventional titanium dioxide pigments.

For assisting in dispersion of the primary pigment particles, the pigment slurry to be spray dried may also have incorporated therein about 0.1 to about 2% of a water-dispersible surfactant. Preferably, the surfactant, as with the thickener, is a solid at room temperature and provides with the thickener a bonding action in the dried aggregate. As with the thickener, the surfactant should be soluble or dispersible in the paint solvent system to which the pigment is added, or water in the case of a latex paint.

Particularly suitable surfactants for treatment of pigments for latex paints and plastics, in accordance with the present invention, are polyglycols of molecular weight between about 500 and about 7,000. A suitable surfactant for treatment of pigments for solvent based paints is Tergitol 15-S-7 (trademark, Union Carbide) a linear alcohol containing 15 carbon atoms and 7 moles ethylene oxide, having an HLB value of 12.8.

The slurry prior to drying may also contain about 0.2 to 1.0% on a pigment weight basis of a dispersing assistant, such as a lower molecular weight glycol. Suitable glycols are propylene glycols, tetraethylene glycol, diethylene glycol, and ethylene glycol. These compounds serve as plasticizers for the surfactants, allowing more rapid dissolution of the aggregate bonds during the paint or plastic compounding. By the present invention, effective dispersion during conventional paint or plastic compounding is achieved, with normal energy input, employing a conventional mill such as a Cowles Disperser mill.

Another advantage of the present invention is that it offers economies in pigment processing. The gel coating or bonding of the primary pigment particles appears to effectively suppress the formation of the hydrous oxide bonds. As a result, dry milling of the pigment aggregates is not required. Heretofore, spray drying of the pigment particles without the dry mill step was not considered a viable possibility.

BRIEF DESCRIPTION OF THE DRAWINGS

The invention may best be understood with reference to the accompanying drawings in which:

Referring to FIG. 1, the titanium dioxide primary particles, obtained from either the sulfate process or the chloride process, are preferably finish treated with a surface-treatment material such as silicon dioxide and aluminum dioxide, although surface treatment is not required. The primary particles, in a water slurry, are directed to a filter 12 in which water and soluble salts are separated leaving a filter cake having from 50–60% water. Conventionally, the filter cage is dried in a tunnel-type heater. Following drying, the material conventionally is finely ground in a fluid energy mill to produce a highly dusty product which must be bagged. Bulk storage in a silo would result in caking.

Figure 1:
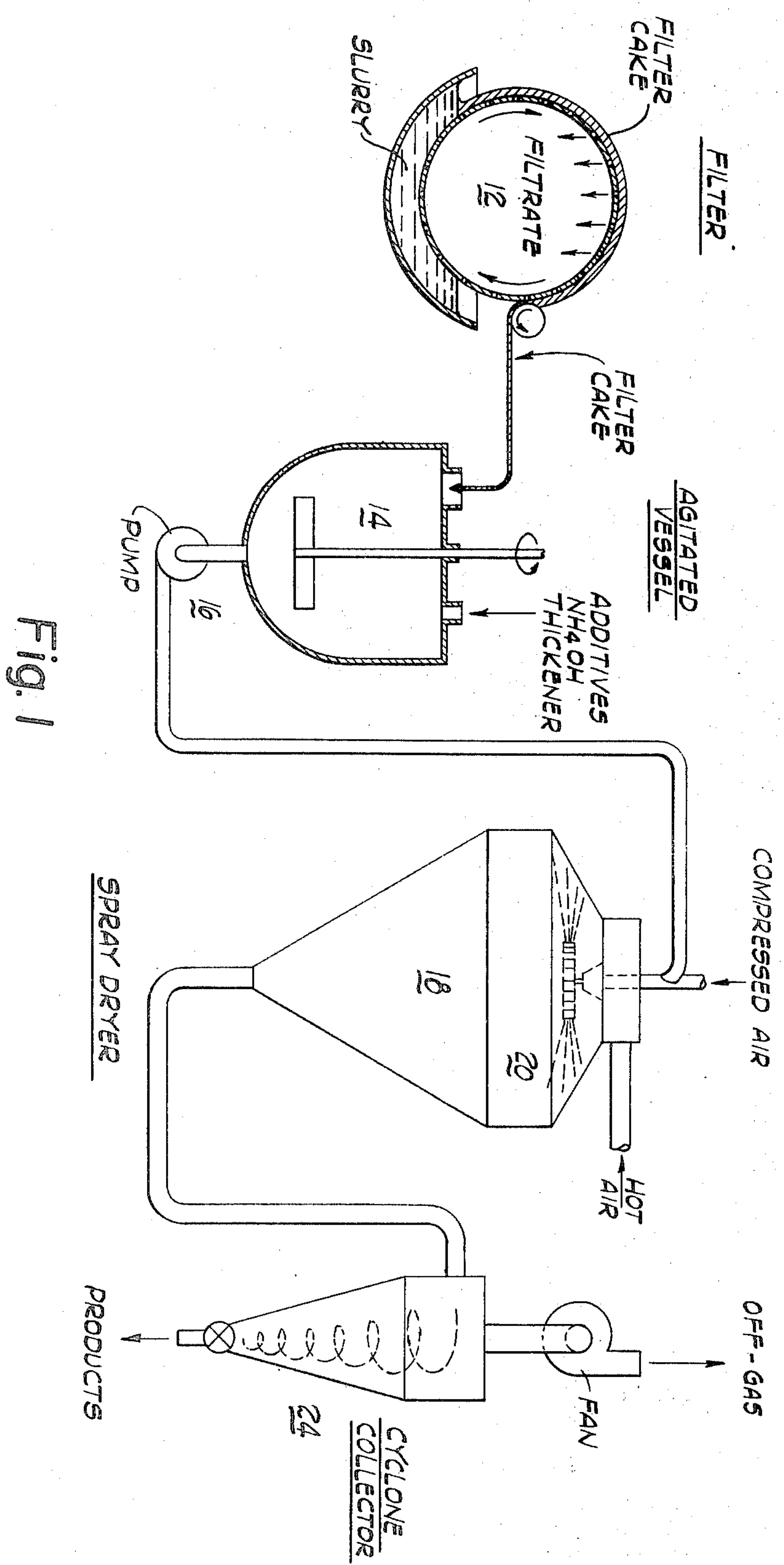
FIG. 1 is a flow diagram illustrating the method of producing titanium dioxide pigments in accordance with the concepts of the present invention.

In accordance with the present invention, the dewatered titanium dioxide floc is transmitted directly to a vat 14 from the filter 12. The filter cake is fluidized with a small amount of ammonium hydroxide or other base. The slurry is then pumped by means of pump 16 to a spray dryer 18 wherein the slurry is dispersed in the form of fine droplets by atomizer 20. The drying in the spray dryer is shown as being cocurrent, although counter-current drying can be employed. The use of ammonium hydrooxide, over plain water, to fluidize the titanium dioxide cake offers the advantage that it is effective in lesser amounts and readily evaporates in the spray dryer.

Following drying, the dried particles are separated from air and water vapor in cyclone separator 24, the free-flowing product then being bagged or shipped to bulk storage.

Preferably the dryer is operated at an inlet temperature of between about 200 and about 400° F. and an outlet temperature of about 100° F. Higher temperatures may be employed, but degradation of the aggregate bonds by excessive temperatures should be avoided. In addition, the drying temperature should be sufficiently low to prevent evaporation loss of organic compounds added to the slurry, for instance, dispersing assistants which are added.

In conventional pigment processing, wet milling frequently is employed to improve dispersion and size distribution of the pigment particles. Wet milling may also be employed in the present invention with pigments produced for spray drying, and is particularly desirable in pigment grades, which in conventional processing, receive little or no wet milling prior to the application of inorganic oxide treatment. The wet milling may be before and/or after surface treatment, but is prior to spray drying.

Figure 2:
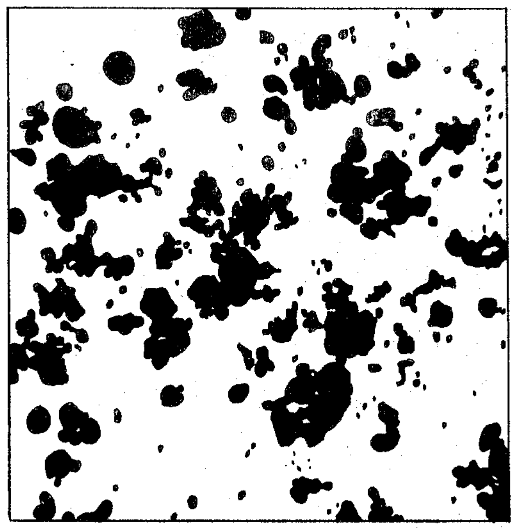
FIG. 2 is a light beam microscope photograph taken at low magnification of pigment aggregates prepared according to the method of FIG. 1.

Referring to FIG. 2, the titanium dioxide pigment according to the present invention consists of a plurality of aggregates, each aggregate comprising a plurality of primary pigment particles bound together. The aggregates shown in FIG. 2 were obtained at the outlet of the cyclone separator 24. It is evident that the pigment aggregates are essentially uniform in size by comparison with conventionally processed pigments. The photograph of FIG. 2 shows the presence of essentially no fines.

Figure 3:
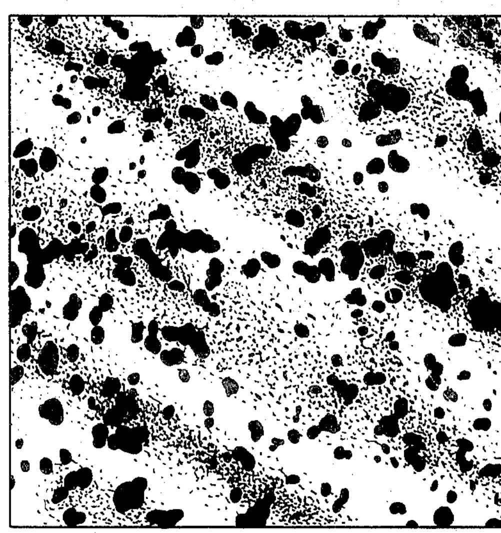
FIG. 3 is an electron microscope photograph of a paint film cross-section taken at high magnification showing dispersibility of the pigment particles of the present invention in paints.

FIG. 3 illustrates the dispersibility of the individual pigment particles, the same being the black opaque dots in the photograph. The photograph shows little or no aggregation of particles in the paint film and relatively uniform distribution. The figure is evidence of the high degree of opacity, dispersibility and tinting strength obtained by the pigments of the present invention.

Preferably the primary $TiO_2$ pigment particles of the present invention have the customary levels of inorganic oxides finish treated thereon, up to 14%, preferably about 3% to about 14% for paint grades and about 1 to 1½% for plastic grades. The highest level of inorganic oxide treatment is with flat latex paints.

The thickener which is added to the pigment slurry is a class of compounds customarily so designated, or alternatively referred to as bodying agents or thickener-stabilizers. These are organic, colloidal, high molecular weight compounds which are water soluble or water dispersible and which are normally solid at room temperature. They are capable in relatively small concentrations in water of causing visible thickening. Preferably they provide at least a viscosity of 10 centipoises at 20° C. in a 2% solution.

The thickeners which may be employed in the present invention should be capable of withstanding dryer temperatures, and should be capable of redissolving or redispersing in the admixture of the paint to which the pigments are added. For instance, in a latex or water-based paint, the thickener should be redispersible in water. In the case of solvent-base paints, the thickener should be redispersible in the paint solvent system. In the case of plastics, the thickener should be meltable at the processing temperatures employed for the plastics.

Examples of suitable thickeners for use in treating pigments for latex paints and plastics are, in the non-cellulosic category, the water-soluble polymerized alkylene oxides, for instance, the ethylene oxide polymers which are widely commercially available and described in U.S. Pat. Nos. 2,866,761 (Example 2); 2,914,491 and 2,917,470.

Particularly suitable ethylene oxide polymers are those marketed under the Union Carbide trademarks Polyox WSR N–10, molecular weight 100,000, and Polyox WSR N–80, molecular weight 200,000. Polyox WRPA–3154, molecular weight 900,000, has also been employed successfully. Still another class of thickeners which can be employed for treating pigments for latex paints and plastics are the esters of polyalkylene glycol or glycerol and fatty acids such as water-dispersible glycerol esters of higher fatty acids such as stearic acid, e.g. Arlacel 165 (trademark Atlas-ICI) having an HLB value near 11. Also in this class are the glycol esters of higher fatty acids such as stearic acid, e.g. "Kessco Ester PEG (600) Distearate." Also useful in connection with the present invention are ethoxylated sterols such as Amerchol "Solulan C–24," an ethoxylated lanolin. Another thickener which can be used is "Thickener LN," trademark General Aniline and Film Corporation. This product is stated to be the ammonium salt of a partial ester of two parts of methyl vinyl ether/maleic anhydride copolymer and 1 part of ethoxylated lauryl alcohol having 16 mols of ethylene oxide units per mol of alcohol unit. Still other suitable thickeners for treating pigments for latex paints and plastics are polyvinyl alcohol such as "Monsanto Resin D–365." Still other suitable bodying or thickening agents are alkali metal caseinates, natural gums including gum tragacanth, locust bean gum, caraya gum, guar gum, Irish moss gum, alkali metal alginates, carboxy methyl dextran, sodium polyacrylates, and polyacrylamides. Suitable cellulosic-type thickeners are hydroxy propyl methyl cellulose (methyl cellulose with some of the methoxyl groups replaced with hydroxy propyl group) and hydroxy ethyl cellulose. Particularly suitable cellulosic compounds are "Methocel 65 HG" and "Methocel 90 HG" (trademarks, Dow Chemical Corporation). "Methocel 65 HG" has from 27–29% methoxyl groups and 4–7.5% hydroxy propoxyl groups, and provides a viscosity of 3,000 to 5,600 centipoises at 20° C. in a 2% aqueous solution. "Methocel 90 HG" is 19.0–24% methoxy groups and 4–12% hydroxy propoxyl groups, and provides a viscosity, in a 2% solution, of 12,000–21,000 centipoises. Hydroxy ethyl cellulose is marketed under the trademark "Cellosize" by Union Carbide Co. One suitable hydroxy ethyl cellulose has a viscosity, in a 1% aqueous solution at 25° C., at 840–960 centipoises. For pigments for solvent-based paints, suitable thickeners are the polyalkylene glycol esters, e.g. polyethylene glycol (molecular weight 400) monooleate having an HLB value of 11.4. The polyalkylene esters are employed in somewhat larger amounts in connection with pigments for solvent-based paints and plastics.

It was found that the addition of such thickeners to the pigment slurry prior to spray drying resulted in an efficient collection of fines producing an essentially dustless product in which there was little or no loss of pigment in cyclone separation following drying.

Particularly satisfactory results were obtained with ethylene oxide polymers of molecular weight of about 100,000–200,000, in amounts of about 0.3% for paint pigment grades and about 0.1% for plastic pigment grades. Up to 2.0% of such oxide polymers can be employed. In percentages of more than 2.0%, the ethylene oxide polymer tended to increase the viscosity, both of the slurry and the paint, to render such higher amounts undesirable.

By the above addition, it was also found that the pigments could readily be bulk handled and bulk stored without caking and destroying the free-flowing properties of the pigments.

Particularly suitable surfactants, for use in combination with the thickener for dispersion of the primary pigment particles, which can be employed in accordance with the concepts of the present invention, are the polyglycols of molecular weight between about 500 and about 7,000, e.g. Dow "Polyglycol–1200" and Dow "Polyglycol–6000"; and certain other non-ionic surfactants such as the polyethylene oxide adducts, e.g. higher alkyl phenoxy polyethoxy ethanols having 8 to 24 ethylene oxide units per mole of alkyl phenol. Particular examples are polyoxy alkylated nonyl phenol, polyoxy alkylated octyl phenol, and mixtures thereof. One such suitable surfactant is "NPO 916" (trademark Whitestone Chemical Co.). Certain anionic surfactants can be employed such as sodium dodecyl benzene sulfate and sodium dodecyl benzene sulfonate. Other surfactants are the derivatives of glycols and fatty acids, such as polyethylene glycol fatty acid esters, and certain carbohydrates, such as starch, sorbitol, glucose and dextrin. For solvent-base paints, a particularly satisfactory surfactant is Tergitol 15–S–7 (trademark Union Carbide), a linear alcohol of about 15 carbon atoms containing 7 mols ethylene oxide and having an HLB value of 12.8.

From about 0.3 to about 2.0% of surfactant may be employed, a preferred range being about 0.5 to about 1.5%.

It is desirable that the pigment aggregates of the present invention be dispersible in a standard mill, such as a Cowles mill, requiring a minimum energy input. Some thickeners and surfactants are more readily dissolved or dispersed in the paints and plastics than others, depending upon the solvent system of the paint. To assist in dissolution of the aggregate bonds and dispersing of the primary pigment particles, it may be desirable to add into the pigment slurry, prior to drying, a conventional dispersant, particularly suitable dispersants being low molecular weight glycols such as propylene glycol, a conventional liquid plastizer for "Polyglycol 6000." As a rule of thumb, the dispersants are employed when the melting point of the surfactant is above about 40° C. Other suitable dispersants are propylene glycols, tetraethylene glycol, diethylene glycol, ethylene glycol and many others. Where more vigorous milling is needed, ball mills, rod mills, roller mills and other conventional mills can be used.

Obviously the organic additives which are employed in accordance with the present invention need not be added separately to the pigment slurry, but can be prepared as a fused product or alloy and added in that form.

The practice of the present invention can be further understood by the following illustrative examples:

EXAMPLE 1

A dewatered filter cake of titanium dioxide pigment for latex paint was fluidized by the addition of a small amount of concentrated aqueous ammonia solution, sufficient to fluidize the slurry. A uniform, fluid slurry was obtained having a solids content of about 50% by weight. Identical samples were then prepared with and without the thickener and/or surfactant. The samples were stirred for a short period of time in a Premier Mill and then were spray dried with an inlet temperature to the spray dryer (Komline–Sanderson, Model R & D) of about 250° F., at a slurry feed rate of about 100 milli-liters per minute, and an outlet temperature of about 125° F., feed pressure being 5 p.s.i.g., employing a Spraying System Company two-fluid nozzle with an air pressure of 60 p.s.i.g. The following table indicates the content of fines appearing in the off-gas from the cyclone collector subsequent to spray drying, for different organic additives (thickener and/or surfactant), and for the control slurry without additives (the spray drying was cocurrent):

TABLE I

| Slurries of latex-grade pigment with additive: | Uncollectable fines in cyclone off-gas from spray drying |
|---|---|
| No additive | Heavy. |
| 3.0% Carbowax 1540 polyethylene glycol (surfactant only). | Do. |
| 2.0% propylene glycol (dispersant only). | |
| 1.0% Amerchol Solulan C–24 | Do. |
| 0.5% Dow Methocel 90 HG | Medium. |
| 0.3 Dow Methocel 60 HG | Light. |
| 0.5% Union Carbide Polyox WSR N-750. | Do. |
| 0.3% Union Carbide Polyox WSR N–750. | None. |
| 0.3% Union Carbide Polyox WSH N–750 plus 0.6% Dow Polyglycol–1200. | Light. None. |

Tests were also conducted on the above samples to determine the bulk properties of the same kind of titanium dioxide pigment prepared according to the concepts of the present invention as compared with pigment prepared by conventional processing and pigments prepared by spray drying but without additives.

TABLE II.—BULK PROPERTIES

| Sample No. | Description | Free-flow | Caking resistance | Dustiness |
|---|---|---|---|---|
| 1 | Conventional latex grade pigment, conventional process | Poor | Medium | High. |
| 2 | Conventional latex grade pigment, spray dried without additives | Medium | do | Do. |
| 3 | Conventional latex grade pigment, but additives* in slurry prior to spray drying. | Good | Good | None. |

*0.5% Dow Methocel 90 HG; or 0.5% Union Carbide Polyox WSR N–750 polyethylene oxide; or 1.0% Amerchol Solulan C–24; or 0.3% Monsanto D–363 hydrolyzed polyvinyl alcohol.

EXAMPLE 2

A dewatered filter cake of a latex grade titanium dioxide pigment which had been surface treated was fluidized by the addition of a small amount of concentrated aqueous ammonia solution, sufficient to fluidize the slurry. As with Example 1, the slurry had a solids content of about 50%. A solution of polyethylene oxide (Union Carbide Polyox WSR N–750), in an amount of about 0.3% based on the weight of the pigment, and Polyglycol-6000 (Dow Chemical Corporation polyethylene glycol) in an amount of about 0.6% based on the weight of the pigment, were added to the slurry. The slurry was then stirred and spray dried following the procedure of Example 1. Only a very light content of fines appeared in the off-gas from the cyclone collector during spray drying. The free-flowing pigment powder displayed good caking resistance.

The pigment was tested in 60 PVC* and 40 PVC latex paints and compared to a product (designated standard) prepared by conventional processing procedures:

TABLE III

| | 60 PVC | 40 PVC |
|---|---|---|
| Tinting strength (percent of standard) | 101.3 | 101.8 |
| Opacity (percent of standard) | 100.7 | 101.4 |
| Texture of the paint film | Equal to standard | |

The above results show the spray-dried product of the present invention to have higher tinting strength and opacity than standard.

EXAMPLE 3

Dewatered titanium dioxide filter cake was fluidized as in Example 1 and was then treated with polyethylene oxide thickener (Union Carbide Polyox WSR N–750) at a level of 0.3% dry polymer based on the pigment weight and, 1.0% (based on the pigment weight) of liquid polyethylene glycol (Dow Polyglycol 1200) as the surfactant. The thickener and surfactant had been predissolved in a small amount of water, not included in the above percentages. The thickener and surfactant were stirred into the slurry at room temperature.

The slurry was then spray dried, with an inlet temperature of 300° F., a chamber outlet temperature of 160° F., a feed rate of 100 ml./minute, and a feed pressure of 4 p.s.i.g., with nozzle and spraying conditions equal to those in Example 2. A minor amount of uncollected fines were apparent in the cyclone collector off-gas; slightly heavier than in Example 2. The fines in the off-gas, however, were much higher than with spray-dried pigment slurry containing no thickener. The product was free-flowing.

The product was tested in 60 PVC latex paint with the following results (compared to standard):

| | |
|---|---|
| Tinting strength | 100.2%. |
| Opacity | 100.5%. |
| Texture of paint film | Equal to standard. |

EXAMPLE 4

Dewatered titanium dioxide filter cake was fluidized and treated with 0.3% polyethylene oxide resin (Polyox WSR N–750) and a 0.6% solid polyethylene glycol (Polyglycol 6000) as in Example 2. The slurry was then stirred in a Premier Mill and was spray dried with an inlet air temperature of 300° F., a chamber outlet temperature of 145° F., a feed rate of 100 ml./minute, a feed pressure of 5 p.s.i.g., nozzle and spraying conditions being equal to those in the previous examples. A lower content of uncollected fines was noted in the collector off-gas than in Example 2. Fines here were only barely visible.

The product had good free-flowing properties, and was tested in 60 PVC and 40 PVC latex paints, with the following results compared to standard:

| | 60 PVC | 40 PVC |
|---|---|---|
| Tinting strength | 101.2 | 102.5 |
| Opacity | 100.9 | 100.1 |
| Texture of paint film | Equal to standard | |

EXAMPLE 5

Sulfate process plastics grade titanium dioxide filter cake was fluidized by the addition of a small amount of aqueous ammonia. The resulting slurry contained about 50% pigment and was treated with an aqueous solution containing 0.2% polyethylene oxide resin (Union Carbide Polyox WSR N–750) and 0.5% glycol glyceryl stearates (Atlas—ICI Arlacel 165), based on pigment weight. The slurry was then spray dried with an inlet air temperature of 300° F., a chamber exit temperature of 130° F., a slurry feed rate of 160 ml./minute, and a feed pressure of 2 p.s.i.g., using a syphon-type nozzle with an air pressure of 60 p.s.i.g. During spray drying, all pigment was collected in the cyclone separator and no fines were visible in the dryer off-gas. The product was free-flowing and had high caking resistance. Its tinting strength in flexible vinyl was equal to that of pigment produced following conventional processing.

EXAMPLE 6

Dewatered plastics grade titanium dioxide filter cake was refluidized with ammonia and divided into samples.

*PVC is the designation for pigment volume concentration in paint and defines the ratio of pigment to binder by volume. The term is described in "Technology of Paints, Varnishes & Lacquers," Charles R. Martens, Copyright 1968, Reinhold Book Corp., page 498.

Thickeners and surfactants were added to the slurry samples, which were then spray dried in accordance with the concepts of the present invention, and the properties of the resulting pigment products were determined by comparison with pigments prepared by conventional processes.

TABLE III.—BULK PROPERTIES

| Sample number | Thickeners | Tinting strength in vinyl plastic (percent) of standard | Ease of dispersion in vinyl compared to standard | Fines in Off-gas | Free-flow | Caking resistance |
|---|---|---|---|---|---|---|
| 1 | 0.5 PEO* | 99.0 | Equal | None | Medium | Medium. |
| 2 | 0.2 PEO* | 98.0 | Slightly lower | do | do | Poor. |
| 3 | 0.2 PEO*, 1.0% glycol stearate** | 97.8 | do | do | Good | Good. |
| 4 | 2.0% glycol stearate** | 99.7 | Greater | do | do | Do. |

*Polyethylene oxide polymer (Polyox WSR N-750).
**Arlacel 165.

EXAMPLE 7

When lithopone, zinc oxide, red iron oxide, and chrome yellow primary pigment particles are treated substantially like the $TiO_2$ pigment of Example 1 with 0.5% Polyox WSR N–750, the spray drying forms minute aggregates with efficiency comparable to that obtainable with such $TiO_2$ pigment.

Useful spray dryer types, auxiliary apparatus therefor, and operation thereof for the purpose of the present invention are shown on pages 838–848 of *Chemical Engineers' Handbook,* edited by John H. Perry, Third Edition *1950*, published by McGraw-Hill Book Company, New York. Estimated atomized droplet size (and therefore the resulting dried aggregate which may even condense a bit) usually is 10–400 microns and preferably about 20–200 microns effective diameter. These can be substantially larger, e.g. 600–2,000 microns, without detracting materially from the invention. Atomizer types can be any of those conventional for spray drying, typically the two-fluid nozzle variety (for example, concentric tubes with slurry feed in the inner tube and compressed air in the outer tube), or the one-fluid nozzle type (airless spray), or a spinning disc. Slurry solids content is a large factor in adapting the dryer apparatus; practical low solids content generally is dictated by the expense of removing more water, practical high solids content by the pumpability and sprayability of the slurry feed to the dryer.

Fluidizing the pigment or titanium dioxide filter cake can be accomplished by any strong base which is fugitive at drying temperatures. A particularly suitable base is ammonium hydroxide. A preferred aqueous ammonium hydroxide solution has about 30% concentration, which in small amounts, e.g. about 0.1 to 0.5 weight percent $NH_3$ based on the pigment weight, readily fluidizes a flocculated cake of approximately 50% water. By comparison about 20% additional water, based on the weight of the pigment, would have to be added to achieve pumpability.

I claim:

1. In a process for treating mineral pigment, to produce a free flowing and substantially dustless mineral pigment aggregate which is readily dispersible in a paint or plastic, the improvement comprising:

forming a pumpable slurry of primary pigment particles with water and about 0.1 to about 5.0%, based on pigment particle weight, of a water-soluble or water-dispersible organic, colloidal high molecular weight thickener capable in small concentrations of less than about 5.0% of visibly causing thickening when added to water;

atomizing the resulting slurry;

spray drying the atomized slurry, said atomization and spray drying forming a plurality of minute, discrete aggregates of primary pigment particles bound together; and recovering the minute, discrete pigment aggregates from the spray drying operation, said thickener being normally a solid at room temperature, non-degradable and non-volatile at spray drying temperatures and capable on hardening of creating sufficiently strong aggregate bonds to withstand normal handling and storage without destruction, said bonds, however, being readily destructible in the paint or plastic system to which the pigment aggregates are added.

2. The process of Claim 1 wherein said primary pigment particles are pigmentary titanium dioxide and the maximum spray drying temperature is not substantially in excess of about 400° F.

3. The process of Claim 2 wherein said pigment particles have been surface-treated with hydrous oxides, said thickener being employed in sufficient amount to suppress the formation of hydrous oxide bonds.

4. The process of Claim 2 wherein said thickener provides a viscosity in a 2% water solution at 20° C. of at least about 100 centipoises.

5. The process of Claim 1 wherein the slurry also contains about 0.1 to about 2.0%, based on pigment particle weight, of a water-soluble or water-dispersible surfactant.

6. The process of Claim 5 wherein said surfactant is a polyglycol having a molecular weight between about 500 and 7000.

7. The process of Claim 6 further including a water-soluble dispersant for said surfactant.

8. The process of Claim 7 wherein said dispersant is a lower molecular weight glycol.

9. The process of Claim 1 wherein said thickener is an alkylene oxide polymer in a proportion of about 0.1 to 2%.

10. The process of Claim 9 wherein said alkylene oxide polymer is an ethylene oxide polymer having a molecular weight of about 100,000 to about 900,000.

11. The process of Claim 1 wherein said thickener is an hydroxy alkyl cellulose in a proportion of about 0.1 to 2%.

12. In a process for treating mineral pigment to produce a free flowing and substantially dustless mineral pigment aggregate which is readily dispersible in paints, the improvement comprising:

forming a pumpable slurry of primary pigment particles with water and about 0.1% to about 2.0% based on the pigment particle weight, of a water-soluble or water-dispersible organic, colloidal high molecular weight thickener;

atomizing the resulting slurry;

spray drying the atomized slurry, said atomization and spray drying forming a plurality of minute, discrete aggregates of primary pigment particles bound together;

recovering the minute, discrete pigment aggregates from the spray-drying operation;

said thickener being normally solid at room temperature, non-degradable and non-volatile at spraying temperatures, and dispersible in the paint solvent system to which the pigment is added, said thickener providing a viscosity in a 2% water solution at 20° C. of at least about 100 centipoises;

said thickener further being capable on hardening of creating sufficiently strong aggregate bonds to withstand normal handling and storage without destruction.

13. The process of Claim 12 wherein said primary pigment particles are pigmentary titanium dioxide and the maximum spray drying temperature is not substantially in excess of about 400° F., said slurry also containing about 0.1 to about 2.0%, based on the pigment particle weight, of a water-dispersible surfactant.

14. In a process for treating mineral pigment to produce a free flowing and substantially dustless mineral pigment aggregate which is readily dispersible in plastics, the improvement comprising:

forming a pumpable slurry of primary pigment particles with water and about 0.1% to about 2.0%, based on the pigment particle weight, of a water-soluble or water-dispersible organic, colloidal high molecular weight thickener capable in small concentrations of less than about 2.0% of visibly causing thickening when added to water;

atomizing the resulting slurry;

spray drying the atomized slurry, said atomization and spray drying forming a plurality of minute, discrete aggregates of primary pigment particles bound together; and recovering minute, discrete pigment aggregates from the spray-drying operation, said thickener being normally solid at room temperature, non-degradable and non-volatile at spray drying temperatures, and meltable at the processing temperature of the plastic to which the pigment is added, said thickener further being capable on hardening of creating sufficiently strong aggregate bonds to withstand normal handling and storage without destruction.

15. The process of Claim 14 wherein said pigment is titanium dioxide, said thickener providing a viscosity in a 2% water solution at 20° C. of at least about 100 centipoises.

16. Minute, discrete aggregates of pigmentary titanium dioxide particles wherein the particles of the aggregate are bound together with spray-dried residue of about 0.1 to about 2.0% water-soluble or water-dispersible organic, colloidal high molecular weight thickener capable in small concentrations of less than about 2.0% of visibly causing thickening when added to water, based on the weight of said titanium dioxide particles, said thickener being normally a solid at room temperature, non-degradable and non-volatile at spray drying temperatures and capable on hardening of creating sufficiently strong aggregate bonds to withstand normal handling and storage without destruction, said bonds, however, being readily destructible in the paint or plastic system to which the pigment aggregates are added.

17. Minute, discrete aggregates of pigmentary titanium dioxide particles for addition to a paint or plastic wherein the particles of the aggregate are bound together with spray-dried residue of about 0.1 to about 2.0% water-soluble or water-dispersible organic, colloidal high molecular weight thickener capable in small concentrations of less than about 2.0% of visibly causing thickening when added to water and about 0.1 to 2.0% of water-soluble or water-dispersible surfactant, based on the weight of said titanium dioxide particles, said thickener being normally a solid at room temperature, non-degradable and non-volatile at spray drying temperatures and capable on hardening of creating sufficiently strong aggregate bonds to withstand normal handling and storage without destruction, said bonds, however, being readily destructible in the paint or plastic system to which the pigment aggregates are added.

18. In a process for treating mineral pigment, to produce a free flowing and substantially dustless mineral pigment aggregate which is readily dispersible in a paint or plastic, the improvement comprising:

forming a dewatered filter cake of primary titanium dioxide pigment particles, the filter cake having a water content of about 45% to about 65%;

fluidizing said filter cake into a pumpable slurry with the addition of a strong base;

adding to said slurry about 0.1 to about 5.0%, based on pigment particle weight, of a water-soluble or water-dispersible organic, colloidal high molecular weight thickener capable in small concentrations of less than about 5.0% of visibly causing thickening when added to water;

atomizing the resulting slurry;

spray drying the atomized slurry, said atomization and spray drying forming a plurality of minute, discrete aggregates of primary pigment particles bound together; and recovering the minute, discrete pigment aggregates from the spray drying operation, the base being fugitive at spray drying temperatures, said thickener being normally a solid at room temperature, non-degradable and non-volatile at spray drying temperatures and capable on hardening of creating sufficiently strong aggregate bonds to withstand normal handling and storage without destruction, said bonds, however, being readily destructible in the paint or plastic system to which the pigment aggregates are added.

19. The process of Claim 18 wherein said base is ammonium hydroxide.

References Cited

UNITED STATES PATENTS

| | | | |
|---|---|---|---|
| 3,488,204 | 1/1970 | Jordan et al. | 106—308 Q |
| 3,506,466 | 4/1970 | Bramekamp et al. | 106—300 |
| 3,660,129 | 5/1972 | Luginsland | 106—300 |
| 2,690,398 | 9/1954 | Guertler et al. | 106—309 |

U.S. Cl. X.R.

106—308-Q, 309

DELBERT E. GANTZ, Primary Examiner

J. V. HOWARD, Assistant Examiner

PO-1050
(5/69)

UNITED STATES PATENT OFFICE
CERTIFICATE OF CORRECTION

Patent No. 3,843,380 Dated October 22, 1974

Inventor(s) Edgar Joachim Beyn

It is certified that error appears in the above-identified patent and that said Letters Patent are hereby corrected as shown below:

In the specification column 7, lines 3 - 20, Table I should appear as follows:

TABLE I

| Slurries of latex-grade pigment with additive | Uncollectable fines in cyclone off-gas from spray drying |
|---|---|
| no additive | heavy |
| 3.0% Carbowax 1540 poly-ethylene glycol (surfactant only) | heavy |
| 2.0% propylene glycol (dis-persant only) | heavy |
| 1.0% Amerchol Solulan C-24 | medium |
| 0.5% Dow Methocel 90 HG | light |
| 0.3% Dow Methocel 60 HG | light |
| 0.5% Union Carbide Polyox WSR N-750 | none |
| 0.3% Union Carbide Polyox WSR N-750 | light |
| 0.3% Union Carbide Polyox WSR N-750 plus 0.6% Dow Polyglycol-1200 | none |

Signed and sealed this 14th day of January 1975.

(SEAL)
Attest:

McCOY M. GIBSON JR.
Attesting Officer

C. MARSHALL DANN
Commissioner of Patents